US012021729B2

(12) United States Patent
Kunimitsu et al.

(10) Patent No.: US 12,021,729 B2
(45) Date of Patent: Jun. 25, 2024

(54) DUAL FRAME SEQUENCE TABLES FOR NETWORK TESTING

(71) Applicant: Spirent Communications, Inc., San Jose, CA (US)

(72) Inventors: Jocelyn Kunimitsu, Honolulu, HI (US); Wade Teruya, Honolulu, HI (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

(21) Appl. No.: 17/991,764

(22) Filed: Nov. 21, 2022

(65) Prior Publication Data
US 2023/0164057 A1    May 25, 2023

Related U.S. Application Data

(60) Provisional application No. 63/282,047, filed on Nov. 22, 2021.

(51) Int. Cl.
*H04L 43/50*    (2022.01)
*H04L 12/00*    (2006.01)
(Continued)

(52) U.S. Cl.
CPC ............ *H04L 43/50* (2013.01); *H04L 41/145* (2013.01); *H04L 43/08* (2013.01); *H04L 12/00* (2013.01); *H04L 47/10* (2013.01)

(58) Field of Classification Search
CPC ......... H04L 47/10; H04L 43/55; H04L 43/50; H04L 43/20; H04L 43/08; H04L 43/0876;
(Continued)

(56) References Cited

U.S. PATENT DOCUMENTS 6,414,942 B1    7/2002    Ito et al.
6,597,699 B1 *  7/2003    Ayres .................... H04L 47/50
                                                            370/469

(Continued)

FOREIGN PATENT DOCUMENTS

| EP | 0895375 A2 | 2/1999 |
|----|------------|--------|
| EP | 1443703 A1 | 8/2004 |
| WO | 2007004558 A1 | 1/2007 |

OTHER PUBLICATIONS

Keiser, G. et al. "Test traffic generation equipment and algorithms for evaluating ATM networks" Computer Communications, Elsevier Science Publishers BV, Amsterdam, NL, vol. 19, No. 12, Oct. 1, 1996, pp. 962-971.

(Continued)

*Primary Examiner* — Rachel J Hackenberg
(74) *Attorney, Agent, or Firm* — Haynes Beffel & Wolfeld LLP; Ernest J. Beffel, Jr.; Franklin M. Schellenberg

(57)    ABSTRACT

The frame sequence table (FST) architecture disclosed here partitions an FST stored in the Block RAM on an FPGA into at least two tables for emulating frame sequences for testing network equipment by providing more accurate emulations of network environments. In some implementations, one FST (the primary FST) provides frame listings for high data rate streams, while the other FST provides low data rate streams (the "slow" FST, or SFST). Data compression techniques may be used for the primary FST, allowing emulation of high frame rates using multiple repetitions of frames, while the separation of low frequency streams into the SFST (along with residuals from the primary FST), allows them to be represented accurately when mixed into the final data stream in the output port. A "ping-pong" state machine implemented in firmware governs the selection of (Continued)

data streams from the primary FST and SFST into the output data flow.

20 Claims, 11 Drawing Sheets

(51) Int. Cl.
*H04L 41/14* (2022.01)
*H04L 43/08* (2022.01)
*H04L 47/10* (2022.01)

(58) Field of Classification Search
CPC ......... H04L 43/04; H04L 43/02; H04L 43/00; H04L 43/06; H04L 43/12; H04L 41/145; H04L 12/00
See application file for complete search history.

(56) References Cited

U.S. PATENT DOCUMENTS

| | | | |
|---|---|---|---|
| 6,950,405 B2 * | 9/2005 | Van Gerrevink | H04L 43/50 370/252 |
| 7,805,287 B1 | 9/2010 | Jones | |
| 7,872,988 B1 * | 1/2011 | Hatley | H04L 43/50 370/252 |
| 8,102,776 B2 | 1/2012 | Fujikami et al. | |
| 8,582,466 B2 * | 11/2013 | Gintis | H04L 43/50 370/252 |
| 11,431,606 B2 * | 8/2022 | Rao | H04L 43/50 |
| 2003/0198246 A1 | 10/2003 | Lifshitz et al. | |
| 2007/0008897 A1 | 1/2007 | Denton et al. | |
| 2007/0067130 A1 | 3/2007 | Toda et al. | |
| 2008/0225841 A1 | 9/2008 | Conway et al. | |
| 2009/0059804 A1 * | 3/2009 | Fujikami | H04L 43/50 370/250 |
| 2009/0116387 A1 | 5/2009 | Takai | |
| 2010/0008248 A1 * | 1/2010 | Constantine | H04L 43/50 370/252 |
| 2010/0124171 A1 | 5/2010 | Yoneyama et al. | |
| 2011/0261698 A1 * | 10/2011 | Kamerkar | H04L 43/0888 370/252 |
| 2015/0049772 A1 * | 2/2015 | Bergeron | H04L 43/50 370/474 |
| 2017/0171044 A1 * | 6/2017 | Das | H04L 69/329 |

OTHER PUBLICATIONS

PCT/US2008/010377—International Search Report dated Feb. 26, 2009, 5 pages.

* cited by examiner

| Entry # | Repeat Count | Frame Identifier |
|---|---|---|
| 0 | 2 | 1 |
| 1 | 4 | 2 |
| 2 | 1 | 3 |

FIG. 2

Example 1

Network Profile

| | s/ in frames/sec. (fps) |
|---|---|
| stream1 | 49,000 |
| stream2 | 51,000 |
| Total fps: | 100,000 |

Factors

| | FST Divisor min(r, or smallest stream rate) | |
|---|---|---|
| d = | 49,000 | |
| | SFST Divisor | |
| r = | 100,000 | |

Primary FST

| | Portion ti = si / d | Rounddown (Integer portion) | Roundown/256 |
|---|---|---|---|
| stream1 | 1.0000000000 | 1.0000 | 0.003906625 |
| stream2 | 1.0408163265 | 1.0000 | 0.003906625 |

Total primary FST entries: 2  
w/o repeat 0.0078125  
w/ repeat

SFST

Residual fractions from FST fitted:
ri = (Portion − Rounddown) x r

| | | | Residual/256 |
|---|---|---|---|
| stream1 | | 0 | 0.00000000 |
| stream2 | | 4082 | 15.945312250 |

Total SFST entries: 4082  
w/o repeat 15.94531125  
w/ repeat

SFST Proportion

| SFST Ratio: | 0.04082 | = Total SFST Entries / r |
| Bits: | 22 | Bits |
| Bits to partition: | | = SFST Ratio x (2^Bits) |
| Convert to Integer(Fraction): | 171211.489280 | |
| | 171211 | Integer portion |
| | 0.040819883 | = Integer / (2^Bits) |
| | | Cycles to get through SFST |
| | 1000000.2858 | = Total SFST x (Integer / (2^Bits)) |

Error using just primary FST:

| | | = F(ri) x d | Error (fps) |
|---|---|---|---|
| stream1 | | 49,000 | - |
| stream2 | | 49,000 | - 2,000.00 |

Average |Error|: 1000

Error using dual FSTs:

| | (FST x cycles) + SFST | (FST x cycles) + SFST / (Sum/Total fps) | Error (fps) |
|---|---|---|---|
| stream1 | 100,000.2857760310 | 48,999.914601 | -0.085399 |
| stream2 | 104,082.2857760310 | 51,000.085399 | 0.085399 |

Sum: 204,082.5715520620  
Sum / Total fps: 2.040826

Average |Error|: 0.085399

FIG. 7

Example 2

Network Profile

| | si<br>in frames/sec (fps) |
|---|---|
| stream1 | 200,000,000 |
| stream2 | 200,000,100 |
| Total fps: | 400,000,100 |

Factors

| | |
|---|---|
| d = | FST Divisor<br>min(r, or smallest stream rate): 200,000,000 |
| r = | SFST Divisor 1,000,000 |

Primary FST

| | Portion<br>fi = si / d | Rounddown fint<br>(integer portion) | Rounddown/256 |
|---|---|---|---|
| stream1 | 1.000,000000000 | 1,000 | 3.906250000 |
| stream2 | 1.000,000500000 | 1,000 | 3.906250000 |
| Total primary FST entries: | | 2000<br>w/o repeat | 7.8125<br>w/ repeat |

SFST

Residual fractions from FST fitred
ri = (Portion − Rounddown) x r

| | | Residual/256 |
|---|---|---|
| stream1 | 0 | 0.000000000 |
| stream2 | 500 | 1.953125000 |
| Total SFST entries: | 500<br>w/o repeat | 1.953125<br>w/ repeat |

SFST Proportion

| | | |
|---|---|---|
| SFST Ratio: | 0.0005 | = Total SFST Entries / r |
| Bits to partition: | 22 | Bits |
| Convert to Integer/Fraction: | 2097.152000 | = SFST Ratio x (2^Bits) |
| | 2097 | Integer portion |
| | 0.000499964 | = Integer / (2^Bits) |
| | 1000072.485 | Cycles to get through SFST<br>= Total SFST x (integer / (2^Bits)) |

Error using just primary FST:

| | | Error (fps) |
|---|---|---|
| | = Fint * d | |
| stream1 | 200,000,000 | - |
| stream2 | 200,000,000 | 100.00 |
| | Average |Error|: | 50 |

Error using dual FSTs:

| | (FST x cycles) + SFST | (FST x cycles) + SFST<br>/ (Sum/Total fps) | Error (fps) |
|---|---|---|---|
| stream1 | 1,000,072,484.501670 | 200,000,000.0036624 | 0.0036624 |
| stream2 | 1,000,072,984.501670 | 200,000,099.9963376 | -0.0036624 |
| Sum: | 2,000,145,469.0034340000 | Average |Error|: | 0.0036623962 |
| Sum / Total fps: | 5.000362 | | |

DUAL FRAME SEQUENCE TABLES FOR NETWORK TESTING

RELATED APPLICATIONS

This application claims priority to and the benefit of U.S. Provisional Application No. 63/282,047 titled "IMPLEMENTING DUAL FRAME SEQUENCE TABLES FOR HIGH DATA FLOW NETWORK TESTING" filed Nov. 22, 2021, which is incorporated by reference in its entirety for all purposes.

This application is also related to U.S. patent application Ser. No. 11/899,258, now U.S. Pat. No. 8,102,776, filed on Sep. 5, 2007 and entitled "METHODS AND APPARATUS FOR GENERATING SIMULATED NETWORK TRAFFIC", which is hereby incorporated by reference in its entirety for all purposes.

FIELD OF THE TECHNOLOGY DISCLOSED

The technology disclosed relates to generating network traffic to stress-test network components. More specifically, the technology disclosed relates to an architecture for frame sequence tables for generating simulated network traffic in order to test network components.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

A computer network comprises multiple interconnected computer systems. In many computer networks, network devices, such as routers, switches, and hubs, are used to couple network devices and route transmitted data from its source to its destination(s). The use of such computer networks is widespread, and one of the challenges faced by the operators of these networks is protecting the network against failures and performance degradations. These failures and performance degradations can occur for any of a number of reasons, including, for example, network devices receiving network traffic at a faster rate than can be processed.

To test the reliability of networks and network devices, operators of the networks and manufacturers of network equipment frequently use testing equipment that generates simulated network traffic, transmits such traffic over the network, and analyzes the response of the network equipment. Quality of service tests can include measurement of performance according to predefined metrics, such as network bandwidth, latency, jitter, packet loss, frame check sequence (FCS) errors, bit errors, and others that will be known to those skilled in the art. When testing network components, such as a router, switch, or a hub, it can be important for the network components to be presented with network inputs that are comparable to real-world network inputs. Without this emulation of real-world conditions, the output of the testing will not accurately represent real-world situations (e.g., actual real-world results).

The simplest way to present a network with real-world inputs is to connect the equipment to the real-world network. However, in doing so, the equipment is responding to whatever traffic is being transmitted through the network at the time of the test-network usage can vary considerably from moment to moment. The network may be experiencing heavy traffic or very light traffic at that moment. And, once the test is completed and a change implemented, the network may be experiencing a very different usage profile, and any changes that have been implemented may have been created for anomalous network conditions.

An alternative way to generate network traffic is to generate a profile of network inputs for the component that mimic a "typical" network profile. Profiles can be created that represent routine traffic (e.g., data flow) situations, and also heavy traffic situations to stress-test network equipment. This emulated profile can be summoned repeatedly, so that a solution that is crafted in response to input according to the profile can be later tested against the same profile, allowing conclusions to be reliably drawn about the solution's efficacy.

For a profile to emulate typical network traffic, using a wide variety of data streams with different frame rates is appropriate. High frame-rate streams, such as live video transmissions, may be simultaneously transmitted along with very low frame rate streams, such as "keep alive" traffic. "Keep alive" transmission may be, for example, a piece of equipment periodically sending bytes into the network, making sure the connection link is still functional. Such very low stream rate data transmissions may occur, for example, along pipelines for safety status checks, or in hospitals, where patient monitoring equipment needs to verify a line is open and available in case a medical emergency arises.

To represent a typical network accurately, both high data rate streams and low data rate streams need to be represented, and under stress from large volumes of data from high data rate streams, it is important to be able to determine that the low data rate streams have not been lost or neglected.

Storage of created profiles for network emulation can be implemented using field programmable gate arrays (FPGAs). These can be used to store frames and/or their elements, and provide them according to instructions contained in a frame sequence table (FST). The FST identifies particular frames of data to use for the various data flows, and also the order and rate at which they need to be transmitted. The FST may reside in the block RAM memory of the FPGA, and can be used to generate simulated network traffic by providing control over the order of frames and their transmission rates for the traffic configuration of a port.

In its simplest form, an FST provides a listing of frames and the order in which they are to be transmitted. Some FSTs entries may additionally comprise data on repeat counts, i.e. the number of times a frame should be repeated, as well as information related to an interframe gap, representing a waiting time at the end of frame transmission before the next frame is to be sent. A more detailed description of FSTs is provided in U.S. patent application Ser. No. 11/899,258 (now U.S. Pat. No. 8,102,776), incorporated by reference in its entirety.

In principle, the FST could simply reside in the block RAM (random access memory) on an FPGA on a printed circuit board (PCB) or blade, and would dictate the frames that need to be output using the FPGA in the PCB to emulate network traffic. However, memory on an FPGA is limited, and as a result, the size of the FST is limited. An accurate FST may contain hundreds of thousands, or even millions of entries. The block RAM in an FPGA is limited—Xilinx Series 7 FPGAs, for example, only have block RAM in sizes of tens to hundreds of Kbits of data. Instructions for multiple high frame rate streams could quickly fill a FPGA memory block.

Although larger RAM capacity FPGAs are available, they are more expensive, and although FSTs can be stored off chip, transmission to the chip slows down the emulation of the network since instructions are no longer locally managed, making it difficult to achieve desirable testing rates. Compression through the use of repeat factors can allow FSTs to fit into smaller memory blocks, but since diverse real-world streams will rarely have a common factor for compression, use of repeat factors will invariably misrepresent some of the streams, reducing the accuracy of the emulated network traffic.

Thus, a need arises for a new FST architecture that allows for accurate testing at desirable rates while using the available FPGA memory.

BRIEF SUMMARY

The technology disclosed provides improvements to the FST architecture on an FPGA in order to accurately and efficiently provide streams of data that emulate network traffic. The technology disclosed generates high bitrate streams in tandem with granular low bitrate streams, while still offering accurate control of rates and generates multiple data steams where individual rates are more than just simple multiples of each other.

The innovative FST architecture disclosed here partitions the FST stored in the Block RAM on an FPGA into at least two tables, one providing frame listings for low data rate streams (referred to herein as a SFST, for "slow" frequency sequence table), and another for high data rate streams (referred to herein simply as the FST). Data compression techniques may be used for the FST representing the high data rate streams, allowing simulation of high frame rates using, for example, multiple repetitions of frames instead of summoning unique frames, while the separation of slow, low frequency streams into the SFST, along with any residual from the compressed streams stored in the FST, allows them to be represented accurately when mixed into the output port.

Programming may be implemented on FPGA firmware for management of the memory to generate output streams. This firmware may use a combination of frames governed by the FST and the SFST, with the selection between them implemented as a state machine with a "ping-pong" alternating approach, in which data is transmitted as usual from the FST until certain criteria are satisfied (such as the transmission of a predetermined number of frames), a threshold is triggered, at which point the output flow is switched to stream(s) from the SFST. Once the SFST stream(s) have been transmitted and a second criteria are satisfied (such as the transmission of a certain number of frames from the SFST) the system switches back to transmitting the next frames as dictated by the FST.

Using this dual-FST architecture, the primary FST can be compressed using repeat factors, while the residual frames that may be left behind in the compression, as well as streams with smaller data rates, can be placed in the SFST. The SFST may also use repeat factors to compress data, but typically at much smaller rates than used for the primary FST. This allows the block RAM on an FPGA to be used more efficiently, while still proving more accurate data streams emulating network traffic to an output port.

BRIEF DESCRIPTION OF THE DRAWINGS

FIG. 2 illustrates an example of a simple frame sequence table (FST).

FIG. 7 illustrates one example of computations and error results of an implementation using two moderate data streams.

FIG. 8 illustrates one example of computations and error results of an implementation using two large data streams.

Figure 9:
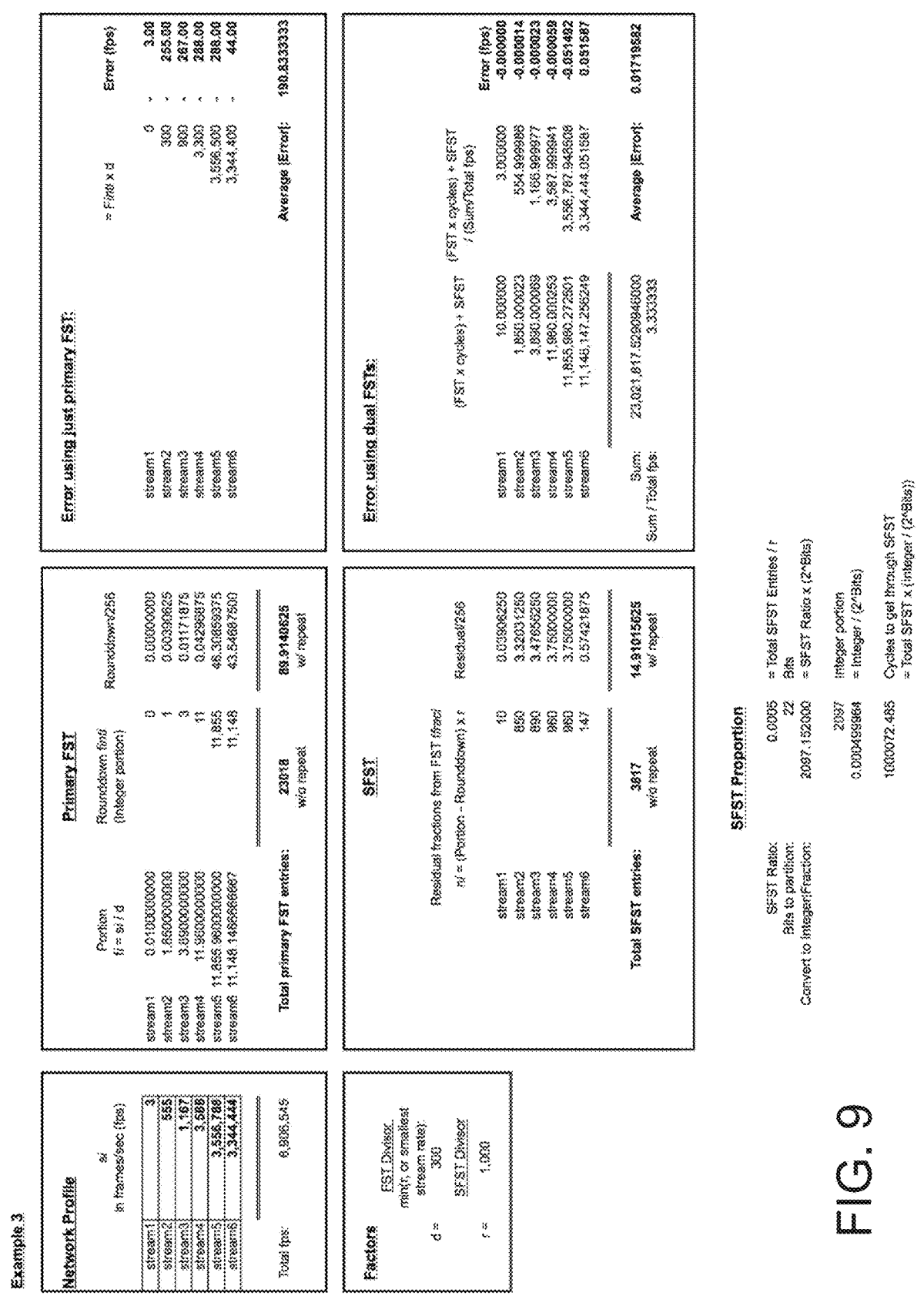

FIG. 9 illustrates one example of computations and error results of an implementation using a variety of data streams.

FIG. 10 illustrates one example of computations and error results of an implementation using a variety of data streams.

DETAILED DESCRIPTION

In view of the limited memory in field programmable gate arrays (FPGAs), the technology disclosed provides improvements to a frame sequence table (FST) architecture in order to accurately and efficiently provide streams of data that emulate network traffic (data flow) for the purpose of testing various network components. The technology disclosed generates high bitrate streams in tandem with granular low bitrate streams, while still offering accurate control of data flow rates and generates multiple data steams where individual rates are more than just simple multiples of each other.

Creation of a Frame Sequence Table (FST)

As has been described in the previously cited application (U.S. Ser. No. 11/899,258, now U.S. Pat. No. 8,102,776, incorporated by reference in its entirety), the creation of an FST to emulate network traffic can be a user-initiated process.

Figure 1:
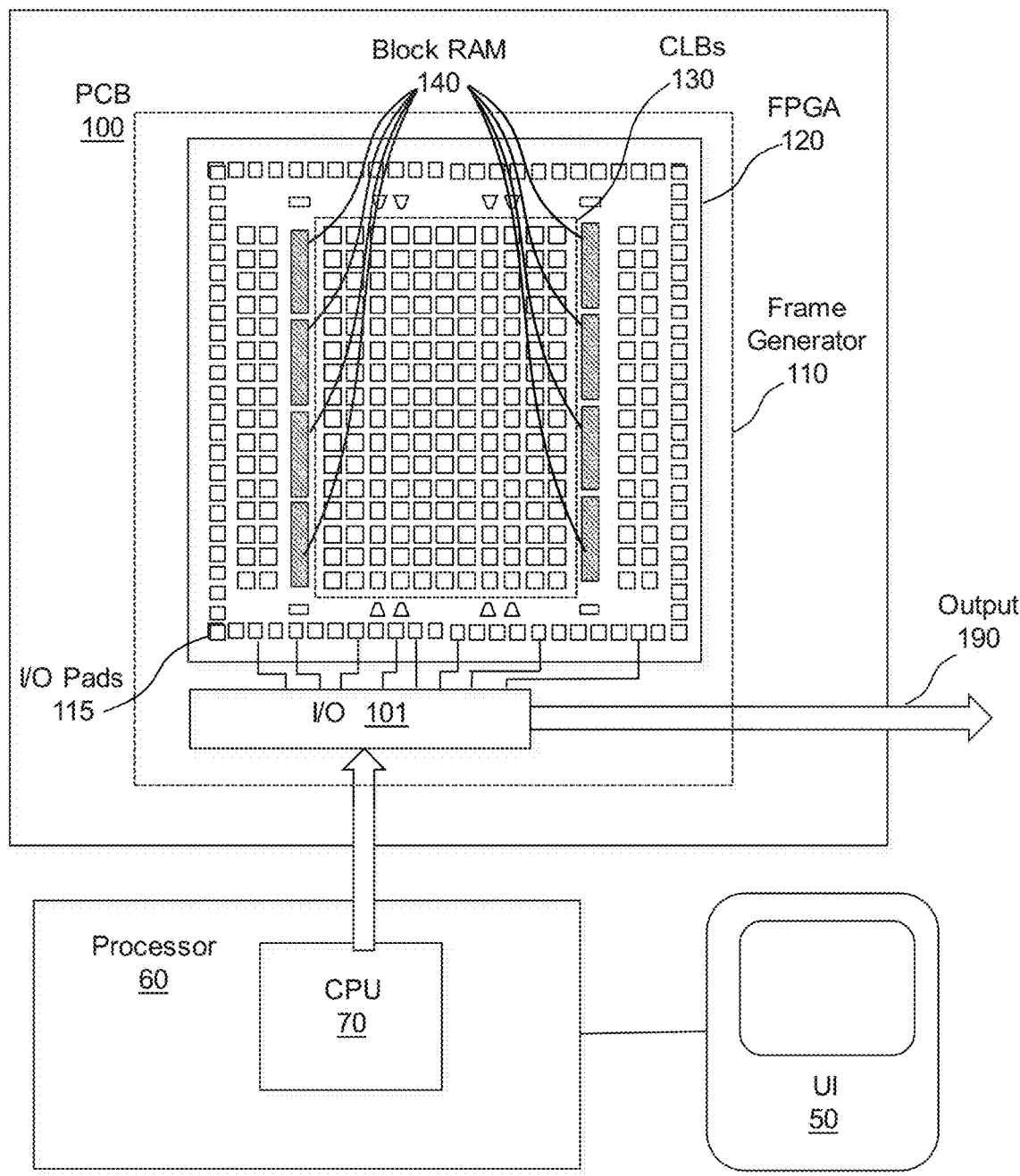
FIG. 1 illustrates schematic diagram of electronic hardware for network testing using a field programmable gate array (FPGA).

FIG. 1 illustrates schematic diagram of electronic hardware for network testing using an FPGA. Specifically, FIG. 1, illustrates a user interface (UI) 50 that provides an interface through which a user can define traffic sources to be simulated and characteristics of these traffic sources, such as frame rates for various data streams. Traffic sources and traffic source characteristics may be defined in any suitable way, as the technology disclosed is not limited in this respect. For example, in some embodiments, a user can specify for a traffic source, the transmission rate of the traffic source, the transmission protocol(s) used by the traffic source, and/or any other suitable characteristic.

A processor 60 with one or more CPUs 70 processes the information input by the user in user interface 50 to determine a sequence of frames to be transmitted that simulate the traffic source(s) identified by the user, and to generate frame template information to be used by a printed circuit board (PCB) 100 containing a frame generator and transmitter 110.

The frame generator and transmitter 110 on the PCB 100 may comprise various electronic circuitry that allow frames and frame sequence tables to be stored. This circuitry may comprise input/output (I/O) circuitry 101, processing and analysis components comprising a field programmable gate array (FPGA) 120, and output 190 transmitted through an output port.

The FPGA 120 in turn may comprise various I/O pads 115 connected to the PCB I/O circuitry 101. The FPGA 120 typically contains configurable logic blocks (CLBs) 130 as well as a number of block RAM components 140. Firmware may be programmed into the FPGA 120 to provide the management of streams for synthesizing an output flow.

Although the implementation of FIG. 1 has been represented using an FPGA 120, other logic circuitry, such as an application specific integrated circuit (ASIC) or other general purpose microprocessor can be used to implement the techniques disclosed here, and the illustration using an FPGA 120, while preferred for some implementations, is not essential.

The FST may be designed to work in conjunction with a frame template generator and a frame generator component that access the instructions of the FST and construct the data streams specified therein according to predetermined templates. They then transmit the frame through an output port (e.g., the output 190) and to the equipment to be tested (e.g., a device under test (DUT)).

FIG. 2 illustrates an example of a simple FST 200. Specifically, FIG. 2 illustrates an FST 200 that comprises a number of entries 202, each having a frame identifier 206 as well as a repeat count 204. In some implementations, an FST may also have an interframe gap value, as was described in the previously cited application U.S. Ser. No. 11/899,258. The repeat count 206 represents how many times the frame may be repeated in a sequence. The frame sequence is then "unrolled" from the FST, repeating the frames as indicated by the repeat count, to create a live data stream of frames according to the data in the FST table.

As previously discussed in the cited U.S. application Ser. No. 11/899,258, the basic interval for providing frames should be determined before providing frames to the output port. The resolution of this interval is partly dictated by the granularity of frames that need to be transmitted. Frame streams are preferred to be parsed into intervals that have a common devisor.

Assume, for example, an FST were to store frame sequences for an output profile having two streams, a first stream having a rate of 2,959,238 fps and a second stream with a rate of 500,111,222 fps. One of these rates is a multiple of the other, and the greatest common factor for all of these stream rates is 2,959,238. This means that a frame sequence table with only (500,111,222+2,959,238)/2,959,238=170 entries can accurately reproduce both of these streams with no error, since a repeat factor of 2,959,238 can be used for both streams.

However, if one stream has a rate of 2,959,237 fps (different by only a single frame per second), while the second stream still has a rate of 500,111,222 fps, the greatest common factor is 1, and a completely accurate representation would require a FST with (500,111,222+2,959,238)/1=2,959,238=503,070,459 entries, which is considerably larger than the 170 entries in the example where the greatest common factor is 2,959,238.

The problem of not keeping the number of entries low (i.e., not implementing an FST that has a large greatest common factor to reduce the number of entries) is compounded when creating FSTs for an output profile with a wide variety of streams. For example, now assume that four streams of data are being provided as the test signal at the same time, where each stream has a different rate. A first stream could have a rate of 2 frames per second (fps), a second stream could have a rate of 34 fps, a third stream could have a rate of 2,959,238 fps, and a fourth stream could have a rate of 500,111,222 fps. Here, the first and second streams are much slower than the third and fourth streams. The greatest common factor for all of these four stream rates is 2; therefore an FST that can accommodate both a rate of 2 fps and 500,111,222 fps must have at least (500,111,222+2,959,238+34+2)/2=251,535,248 entries.

As most block RAM is measured in kBits, storing a table needing over 250 million entries can represent a problem.

Storage can be reduced in the above 4 stream example by neglecting the two slow streams. As shown above, then a table with only 170 entries can, with suitable repeat factors, represent those two high fps streams. But neglecting these two low fps streams is no longer an accurate representation of network traffic, and statistics on a system using this truncated representation for the output would be entirely missing these streams. If the input profile for the equipment under test assumes these streams are present, then the test results will show them missing—and assume it's a fault in the system. But, their absence is the fault of the source, not the fault of the equipment. And if the input profile for the equipment knows these streams are absent when their presence is typical of a real-world network, the test results will not be reflective of the real-world situation.

Dual-FST System Architecture

In order to emulate an FST that is larger than what can easily be stored in memory, the technology disclosed can implement a dual-FST generator. The dual-FST can contain two or more FSTs, each containing frame sequences for different categories of frame rates. Both FSTs may be stored in the same block RAM, or in different block RAM elements of an FPGA.

The initial, or primary FST, can function as an FST as previously disclosed in the patent application U.S. Ser. No. 11/899,258, but designated to hold entries for larger frame rates. The rate threshold can, for example, be for frames greater than or equal to 1,000,000 fps. As an alternative, a second "slow" FST (SFST) can be established for the other rates, for example, rates lower than 1,000,000 fps. This new (second) FST is called a "slow" FST (SFST) since it represents smaller fps rates that consume far less bandwidth. Beyond a simple cutoff threshold in fps, some streams may be divided between the primary FST and the SFST, with the bulk of the frame instructions in the primary FST while residual portions are separated and placed in the SFST. The computation method for parsing streams into the primary FST and the SFST is discussed in more detail below.

As an example for the case of the output profile with four streams discussed in the previous section, the dual-FST can comprise one FST table for the two entries with frame rates over 1 million (which have a least a common factor of 2,959,238, and can be represented using a table with 170 entries) and the second FST for the two lower rates (e.g., below 1 million) (which can be represented with a table with (34+2)/2=18 entries).

The two FST tables (the first FST and the second "slow" FST) therefore can have far fewer entries than a single table containing all 4 streams at once, allowing the sparse block RAM to be more effectively used to represent these 4 streams.

Real-world network traffic would not provide first frames at only higher frame rates, then frames at sparser frame rates—they would be intermixed. In order to allow output frames dictated by both tables in a manner representative of real-world network traffic, a state machine can be implemented in firmware to control a "ping-pong" reading mechanism to alternate frames from the two tables, creating a virtual size ratio between the two tables. Particular predetermined criteria can be defined, so that when these criteria are satisfied, the system switches from transmitting data from the primary FST to the SFST, and additional predetermined criteria can be defined, so that when these additional criteria are satisfied, the system switches from transmitting data from the SFST back to the primary FST, These criteria may also be dynamically updated as various data streams are encountered and transmitted, if programmed accordingly.

Figure 3:
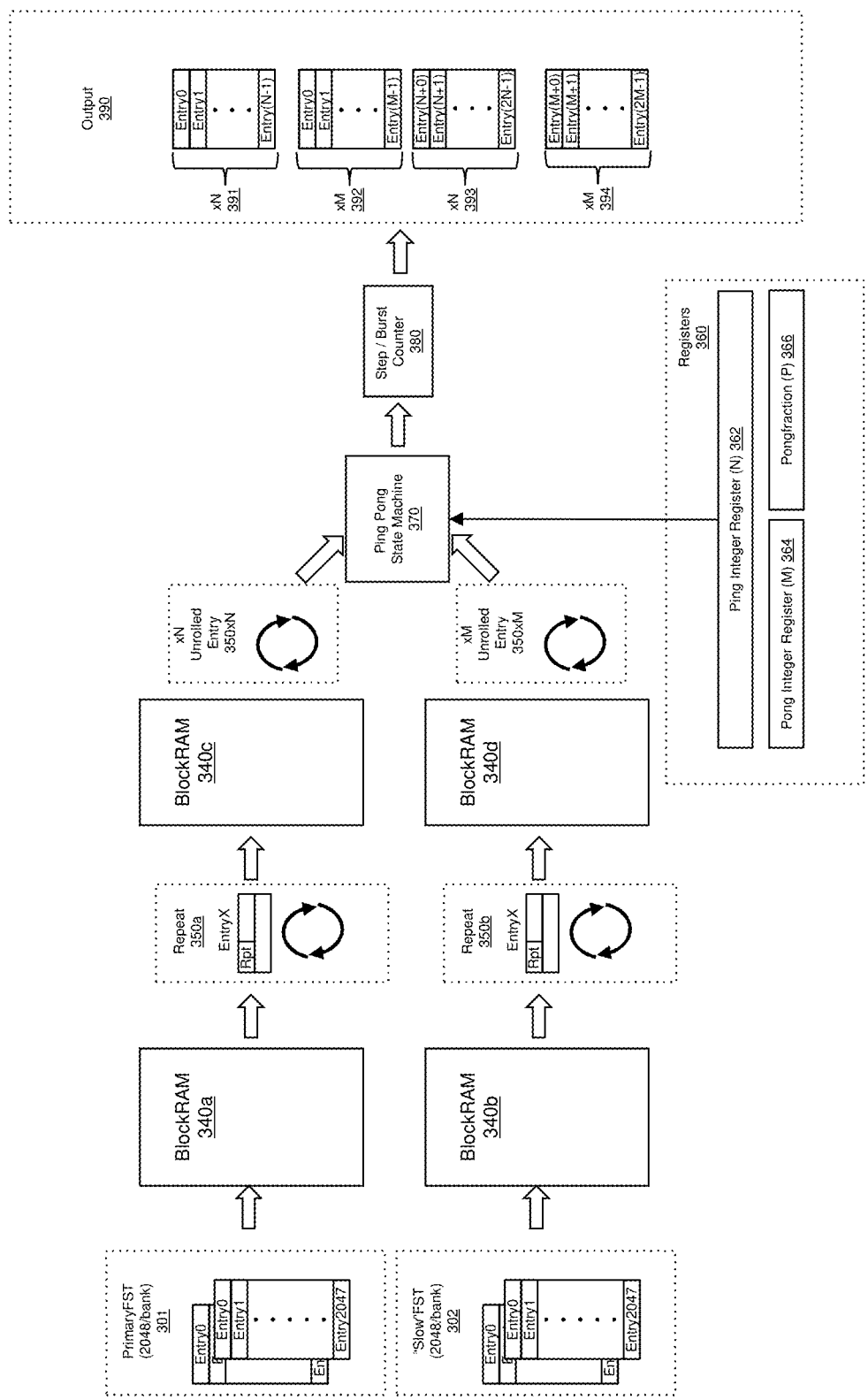
FIG. 3 illustrates a process implemented to alternate between data streams stored in a primary FST and a slow FST to synthesize an output stream.

FIG. 3 illustrates a process implemented to alternate between data streams stored in a primary FST and a slow FST to synthesize an output stream. Specifically, the overall design concept of implementing two FST's working together, and the resulting entry sequence is presented in FIG. 3 and described below.

As illustrated in FIG. 3, the original or primary FST 301 and the SFST 302 are both stored in block RAM elements 340a, 340b. The block RAM may be the same blocks on the FPGA, or different block elements. The FST and the SFST are respectively unrolled, as illustrated in the repeat steps 350a and 350b with the notation "Entry/X" in which the stored repeat count is read and the repeated copies generated. These repeated copies may additionally be stored in block RAM 340c, 340d before being provided to the subsequent circuitry as unrolled entries 350xN for the streams from the primary FST and 350xM for streams from the SFST.

The two data paths of unrolled entries from the primary FST and the SFST converge in a "ping-pong" state machine 370 is implemented in firmware. This state machine 370 allows transmission of data from the primary FST 350xN or the SFST 350xM according to information stored in registers 360 (e.g., a ping integer register 362 for the FST and a pong integer register 364 and a pong fraction 366 for the SFST). The decisions governing the alternation of the data transmission are carried out using the algorithms described below, with the "ping-pong" state machine 370 deciding, based on the algorithm and the values in the registers 360, which stream in that moment to send to the output.

The data obtained from the primary FST and the SFST are then sent through a step/burst counter 380 and prepared as output 390. The output comprises intermixed streams xN 291, 293 from the primary FST 301, and xM 292, 294 from the SFST 302.

Example Frame Sequence Table

For both the FST and the SFST, entries can include information such as that illustrated in FIG. 2.

Frame Identifier indicates which frame is accessed for use, and Repeat Count identifies how many times that particular frame is used/repeated before moving to the next entry in the table. The FST and the SFST can include additional information. In the example of FIG. 2, there are 2+4+1 repeat counts in total, summing to transmit 7 frames total. If the frames from the table are to be accessed/used at a specific rate, then entry 0 has $2/7$ of the rate, entry 1 has $4/7$ of the rate and entry 2 has $1/7$ of the rate. The frames are used to generate data streams that emulate a data flow on a network.

Augmenting the system with the SFST will allow firmware to program the ratio between the FST and SFST sequences with an aim to allow finer granularity of fast+slow stream rates in the output 390. This ratio is controlled by two new control registers 360 that can have variables called "FSTCount" and "SFSTCount", which are used by the state machine 370 to alternate, or "ping-pong" between the primary FST 301 and SFST 302. These registers also enable firmware to program the SFST to provide fractional stream rates to aid in more granularity.

Note that the difference between the primary FST and the SFST is that the system cycles through the SFST at a slower rate because it is more granular. For example, less than one frame (on average) may be read from the SFST for a full read of the primary FST.

Since the system utilizes the primary FST at a higher rate than the SFST, a greater portion of the streams having a faster rate can be allocated to the FST, the extremely slow streams could be completely omitted from the FST and only included in the SFST, and a small fraction of the faster streams can be allocated to the SFST. This way, the required stream rates of all of the streams can be satisfied by primarily reading frames from the FST and reading frames from the SFST at a much lower rate than the frames are read from the FST. In actuality, there could be millions or even billions of streams.

The technology disclosed includes an algorithm that determines which streams include entries in the SFST and the FST and how frequently the entries from the streams appear in the SFST and the FST. These frame rates for the four frames as illustrated above are further used in a detailed example provided below that explains how the algorithm performs.

This dual table (SFST and primary FST) arrangement improves the use of memory on the FPGA because the memory requirements to define correct stream ratios in one single (larger) table can be reduced (compressed) by using repeat counts for frames in one or both tables, with the ping-pong register defining transmission ratios for frames from the two tables.

The Ping-Pong State Machine (SM).

Under normal operation, a system may begin by reading frames from the primary FST 301, unrolling them using the repeat function 350a and registering the frame counts in the ping integer register 362 using a variable FSTCount. It is only when firmware sets the FSTCount to a non-zero value where the State Machine will start to "ping-pong" between the primary FST and the SFST.

Figure 4:
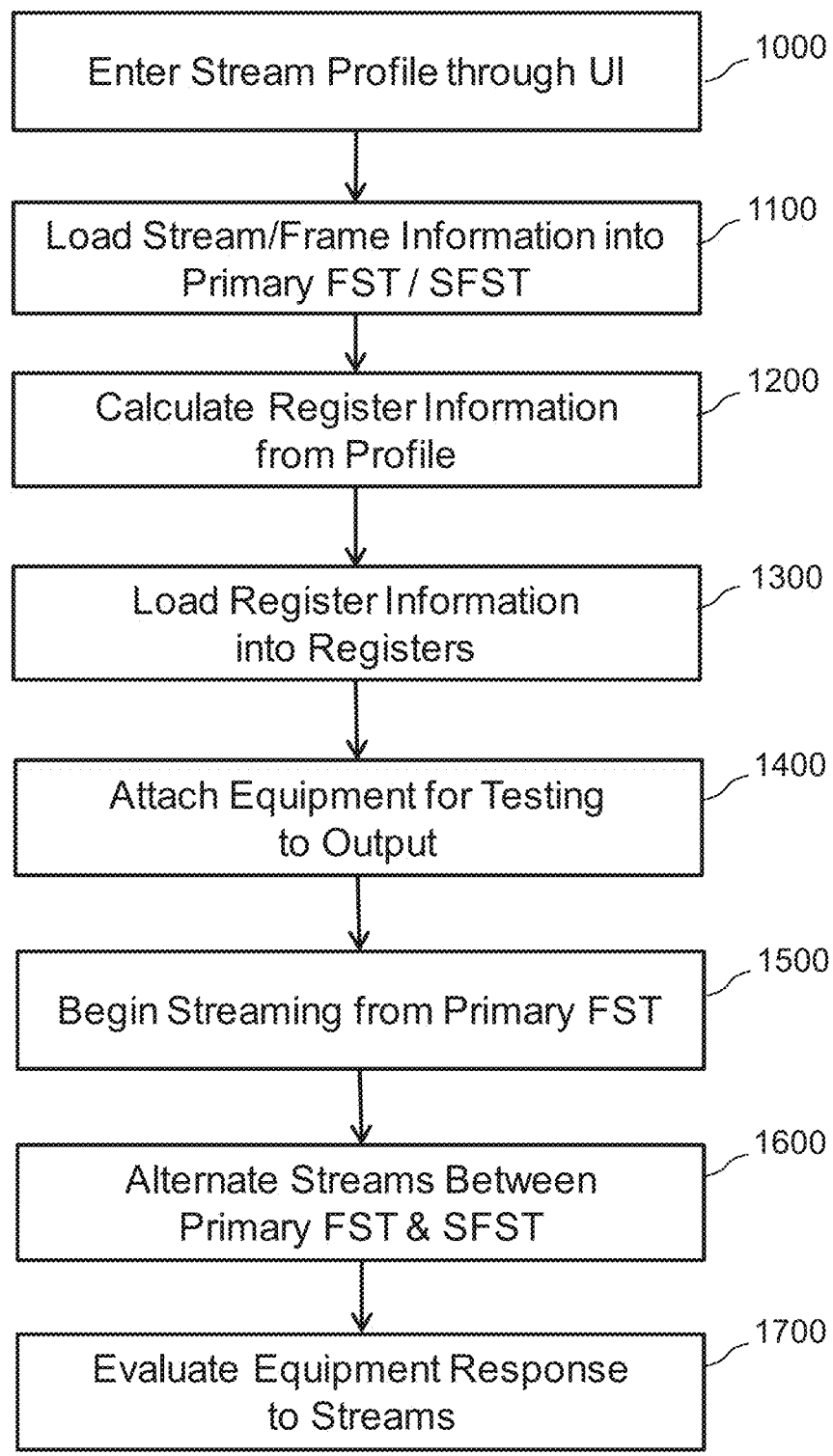
FIG. 4 illustrates a flow chart for testing network equipment using the dual FST technology.

FIG. 4 illustrates a flowchart for the use of the methods described above.

To begin, in operation 1000, the profile of the network to be emulated is entered into the system. This can be done via a user interface (UI) and an external computer, as illustrated in FIG. 1, and the data may comprise a listing of streams and their relative frame rates in frames per second (fps).

After this, in operation 1100, the frames, frame repeat rates, and frame per second information in the profile are then entered into the FST and SFST according to various predetermined rules for parsing the data. This parsing may be a simple fps threshold value, or may involve more complex algorithms to divide the frame instructions between the primary FST and the SFST.

After this, in operation 1200, the information regarding the algorithmic computation for switching between the primary FST and the SFST, such as the value of accumulation.integer (see computation examples below) is formatted as information for the firmware registers.

After this, in operation 1300, this register information is loaded into the registers.

After this, in operation 1400, the equipment to be tested is connected to the output port of the system.

After this, in operation 1500, the system can then begin to transmit frames from the primary FST according to the instructions and deliver them to the equipment through the output port.

After this, in operation 1600, the streams from the primary FST and the SFST are alternated by the "ping-pong" state machine according to the algorithm information stored in the registers, as described in further detail below.

After this, in operation 1700, once the streams have been transmitted, the performance of the network equipment can be evaluated.

Figure 5:
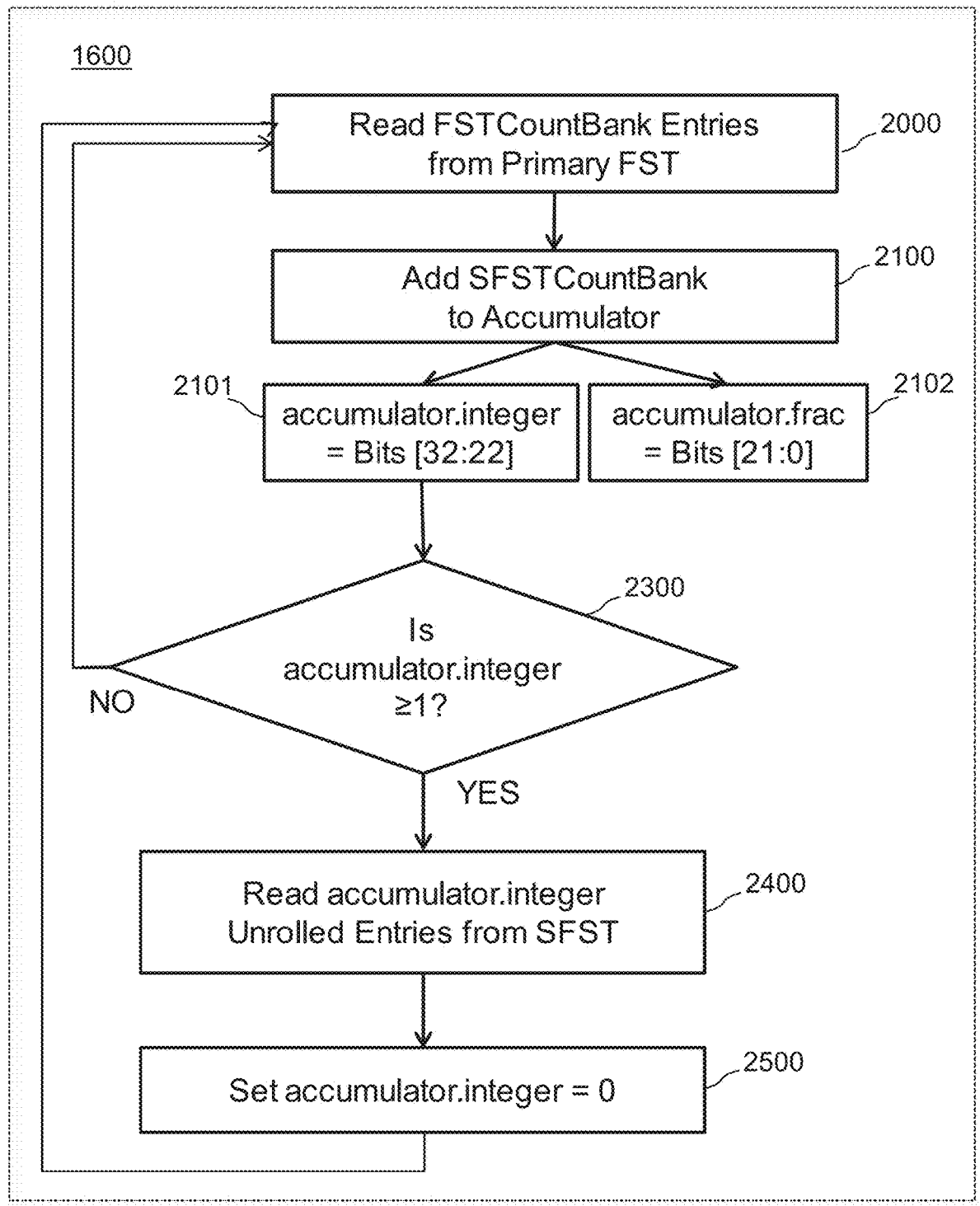
FIG. 5 illustrates a flow chart for partitioning dataflows between the primary FST and the slow FST.

FIG. 5 illustrates a flow chart for the more detailed partitioning dataflows between the primary FST and the slow FST, as may be carried out by the registers 360. In some implementations, this corresponds to the operation 1600 presented in FIG. 4. In this example, first criteria for switching from transmitting files from the primary FST to the SFST is when the value of accumulator.integer is greater than or equal to 1, while second criteria for switching from the SFST back to the primary FST occurs after accumulator.integer number of entries from the SFST have been transmitted.

As illustrated in the flow chart of FIG. 5, the state machine may:
(i) read FSTCountBank(%₁) entries (operation 2000) from the FST memory (FSTCountBank(%₁) normally is programed to equal the size of the unrolled FST, also referred to as a full FST);
(ii) add SFSTCountBank(%₁) to an accumulator (operation 2100), wherein
(a) an accumulator.integer=upper bits [31:22] of the SFSTCountBank(%₁) in the accumulator (operation 2101) and
(b) an accumulator.frac=lower bits [21:0] of the SFSTCountBank(%₁) in the accumulator (operation 2102);
(iii) if the accumulator.integer is greater or equal to 1,(operation 2300), go to (iv), else go to (i) (operation 2000);
(iv) read accumulator.integer unrolled entries from the SFST memory (operation 2400);
(v) set accumulator.integer to 0 (operation 2500); and
(vi) go to (i) (operation 2000).

Examples of the execution of this "ping-pong" alternation between transmitting streams from the primary FST and the SFST are provided in the text and figures that follow.

The integer and fraction are used to determine how many entries to read from the SFST before going back to reading entries from the FST. The number of bits allocated for integer vs. fraction in the SFSTcount can be adjusted based on need/situation/etc. The upper bits define an integer (e.g., 1) and the lower bits define a fraction (e.g., 0.5). The fraction is just a remainder of the integer that is tracked. In this example, the fraction is 0.5, and the integer is 1, resulting in a value of 1.5.

In this example, the SM would read 1 unrolled entry from the SFST table and stop, because it is not possible to do 0.5 of a read. However, the 0.5 remainder is saved for the next cycle. For example, in the next cycle (i.e., the next time entries from the SFST table are read) the SM takes into account the 0.5 remainder from the previous cycle, and adds the 0.5 remainder to the 1.5 value, resulting in a total of 2. Therefore, the SM will read 2 unrolled entries from the SFST in this cycle.

This pattern will continue by reading 1 unrolled entry from the SFST at one cycle, then reading 2 unrolled entries from the SFST at a next cycle, then reading 1 unrolled entry at a next cycle, and so on. Each time one or more unrolled entries are read from the SFST during a cycle, the next cycle picks up where the previous cycle left off. Once the end of the SFST is reached, the SM will go back to the beginning of the SFST and continue accordingly.

Accumulator.

The accumulator is implemented as hardware in the registers 360 that keeps track of the number of entries to read from the SFST by adding the fraction after each FST pass (i.e., hardware has read FSTCount unrolled entries). Once the state machine 370 realizes the value of the accumulator.integer≥1, hardware enables reading from the SFST table. Firmware must convert the fractional part of this number to a binary number. For example, a fraction of '1.5' would be:

$$\text{ratio(22-bit)}=(2^{22})$$
$$*1.5=6291456_{dec}=600000_{hex}=00000000011000000000000000000000_{bin}.$$

The first 10 bits, reading left to right, [0000 0000 01] represent the upper bits [31:22], which identify the value of the integer. The remaining 22 bits [10 0000 0000 0000 0000 0000], reading left to right, represent the lower bits [21:0], which identify the value of the fraction (accumulator.frac).

Registers Implemented by the Technology Disclosed.

Figure 6:
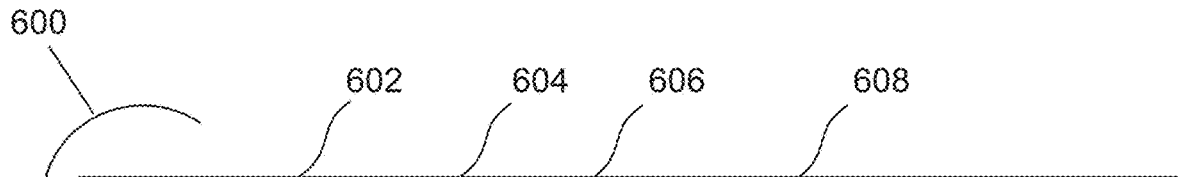
FIG. 6 shows a table of registers in some implementations that are altered with the application of the disclosed technology.

FIG. 6 presents a table 600 of variables implemented in the disclosed technology. These variables are used in the firmware associated with the registers 360 and the state machine 370 as shown in FIG. 3. The table entries are listed by control register name 602, the read/write functionality 604, the bits 606 used for the register in a 32 bit representation, and a description of the function 608.

SFSTBank0 & SFSTBank1.

Note that there are two banks so that dynamic switching between configurations can be implemented. The SM can use one table/bank and then update the other one and then switch back to the previous band/table after the updating is finished.

These registers define the location and size of Bank0 storing an SFST and the location and size of Bank1 storing an SFST. The start of the SFST is identified as SFSTBank0Start and the end of the SFST is identified as SFSTBank0Stop. Similarly, for SFSTBank1, start of the SFST is identified as SFSTBank1Start and the end of the SFST is identified as SFSTBank1Stop. The Bank1 versions are active when FSTBankSelect is set. In other words, FSTBankSelect selects between Bank0 and Bank1. The use of two banks allows one SFST to be updated while the other is being used. In some implementations, the technology disclosed can use more than two banks (e.g., Bank0, Bank1, Bank3, Bank4, etc.) FSTBank0 & FSTBank1.

Note that there are two banks so that dynamic switching between configurations can be implemented. The SM can use one table/bank and then update the other one and then switch back to the previous band/table after the updating is finished.

These registers define the location and size of Bank0 storing an FST and the location and size of Bank 1 storing an FST. The start of the FST is identified as FSTBank0Start and the end of the FST is identified as FSTBank0Stop. Similarly, for FSTBank1, start of the FST is identified as FSTBank1Start and the end of the FST is identified as FSTBank1Stop. The Bank1 versions are active when FSTBankSelect is set. In other words, FSTBankSelect selects between Bank0 and Bank1. The use of two banks allows one FST to be updated while the other is being used.

FSTCountBank0 & FSTCountBank1.

These 32-bit registers define the number of entries of the FST to be read out of memory by the SM before it (optionally) starts to read the slow SFST sequence. The default value of the counter is set to '0' which will cause the SM to disable reading the SFST and will cycle reading through the FST sequence only. Any value greater than '0' will enable the SFST function. FSTCountInt identifies the integer represented in the FSTCountBank0 and the FSTCountBank1, where each bit represents 1 unrolled FST entry. For example, if the value of FSTCountInt of FSTCountBank0 is 5 (e.g., 0000 0000 0000 0000 0000 0000 0000 0101), then the SM reads 5 unrolled entries from the FST.

SFSTCountBank0 & SFSTCountBank1.

These 32-bit registers, each split into an integer part and a fractional part as discussed above, define the number of unrolled SFST entries that are read out of memory by the SM before it goes back to reading the FST sequence.

Since the value programmed could be fractional, an accumulator is used to determine the rolling number of entries to be read and will only trigger reads from the SFST for integer values greater or equal to 1. The number of entries read can then be subtracted from the accumulator. SFSTCountFrac can represent the fractional part of the repeat counter (e.g., 0.5), where each bit of SFSTCountFrac can represent $1/(2^{22})$ of an entry in the SFST. SFST-CountInt can represent the integer part of the repeat counter (e.g., 1), where each bit represents 1 entry in the SFST.

FSTBankSelect.

When this bit is set, Bank1 of the FST and the SFST are active, otherwise use Bank0, Banks are used to support changing stream rates on the fly.

Stream Distribution

Since the SFST normally runs at much slower rates than the primary FST, care is given to how the sequence of frames is distributed throughout the table. For instance, if streamA has 7 entries, and streamB has 2000 entries, the streamA entries should be evenly distributed throughout the 2000 streamB entries. This is more representative of real-world network traffic. At very slow frame rates, clumping together stream entries from the SFST can cause adverse behavior, such as bursts in frame rates.

Algorithm to Set FSTCount and SFSTCount

Following are several examples of the computation of FSTCount and SFSTCount. These allow for the repeat functions to be used to compress entries in the FST, while allowing residual portions of the streams truncated by that compression, along with low data rate streams in their entirety, to be more accurately represented in a SFST.

Stream rates for the ith stream are represented as $s_i$, represented in frames per second (fps).

Resolution of the SFST is represented as $1/r$, where r can be any base 10 number (e.g $10^4=10,000$). This affects the accuracy of the SFST: higher values of r result in more entries and a larger SFST, and lower values of r result in fewer entries and a smaller SFST.

Given each stream rate, $s_i$, calculate a divisor d using $$d=\min\{10^{\wedge}(\text{rounddown}(\log 10(\Sigma s_i)-1),r)\}$$

(note that if the number of number of streams and the stream rates are large, r will generally be smaller than calculated result, and d equals r. However, r can be set to different values, such that d and r are independent of one another).

The portion $f_i$ for each stream $s_i$ is then given by $$f_i=s_i/d;$$

and the integer and fractional parts are given by $$f_{inti}=\text{integer}(f_i);$$

$$f_{fraci}=\text{fraction}(f_i);\text{with}$$

$$n_i=f_{fraci}*r.$$

The number of times each stream should appear in the FST is calculated as $$FST_i=f_{inti},$$

so the total number of entries in the FST is $$t_{fst}=\Sigma FST_i.$$

For example, for 4 streams, $$FST=\{\text{stream}_1(f_{int1}),\text{stream}_2(f_{int2}),\text{stream}_3(f_{int3}),\text{stream}_4(f_{int4})\}$$

The number of times residuals of each stream should appear in the SFST table is calculated as $$SFST_i=n_i=f_{fraci}*r.$$

and therefore (using the greatest common divisor (gcd) function), $$SFST_{igcd}=n_i/\gcd(\{n_0,n_1,\ldots n_i\})$$

and therefore the total number of entries in the SFST is $$t_{sfst}=\Sigma SFST_i.$$

For example, for 4 streams, $SFST=\{\text{stream}_1(n_1), \text{stream}_2(n_2), \text{stream}_3(n_3), \text{stream}_4(n_4)\}$ The ratio of the tables is calculated as $$\text{ratio}=t_{sfst}/r.$$

The FSTCount for this algorithm will equal to the size of the unrolled FST (i.e., this should equal to sending the FST once for every iteration of the SFST accumulator).

Example Calculations

These example calculations are used to set the values for FSTCount and SFSTCount and to populate the SFST and FST.

For $s_1=2fps, s_2=34fps, s_3=8,383,118fps$ and $s_4=500,111,222fps, \Sigma s_i=2+34+8,383,118+500,111,222=508,494,376$ and so $$\text{rounddown}(\log 10(\Sigma s_i)-1)=\text{rounddown}(8.7063-1)=7.$$

Assuming a value of r=10000, divisor d is calculated as follows:

$$d=\min\{10^{\wedge}(\text{rounddown}(\log 10(508,494,376)-1), 10000\}$$

$$=\min\{10^{\wedge}7,10000\}$$

$$=10,000.$$

Using d, $f_i$, for each of the 4 streams is calculated as follows:

$$f_1=0.0002,$$

$$f_2=0.0034,$$

$$f_3=838.3118, \text{ and}$$

$$f_4=50,011.1222.$$

Using $f_i$, $f_{inti}$ is calculated as follows:

$$f_{int1}=0,$$

$f_{int2}=0$, $f_{int3}=838$, and $f_{int4}=50,011$.

Using $f_{inti}$, $t_{fst}=\Sigma FST_i=50,849$ which represents the total number of entries in the primary FST (not the SFST).

Using $f_i$, $f_{fraci}$ are calculated as follows:

$f_{frac1}=0.0002$, $f_{frac2}=0.0034$, $f_{frac3}=0.3118$, and $f_{frac4}=0.1222$.

Again using r=10000, $n_i$ are calculated as follows:

$n_1=2=(0.0002*10000)$, $n_2=34=(0.0034*10000)$, $n_3=3118=(0.3118*10000)$ and $n_4=1222=(0.1222*10000)$.

Using $n_i$, $t_{sfst}=\Sigma SFST_i=4376$.

Using $t_{sfst}$, ratio=4376/10000=0.4376.

Therefore, using the ratio=0.4376:

$FST=\{stream_1(f_{int1}=0), stream_2(f_{int2}=0), stream_3(f_{int3}=838), stream_4(f_{int4}=50,011)\}$ (note the total number of entries in the FST=$t_{fst}$=50,849) (note that the streams can be evenly distributed in the FST, such that there could be approximately 8 entries in the table for stream$_3$ and then 500 entries in the table for stream$_4$, and so on); and $SFST=\{stream_1(n_1=2), stream_2(n_2=34), stream_3(n_3=3,118), stream_4(n_4=1,222)\}$ (note that total number of entries in the SFST=$t_{sfst}$=4,376) (note that the streams can be evenly distributed in the SFST.

Optionally, the SFST can be reduced using a greatest common denominator (which is 2 in this example) to $SFST_{gcd}=\{stream_1(1), stream_2(17), stream_3(1,559), stream_4(611)\}$ Using these calculations, the FSTCount and the SFST-Count binary value can be determined. FSTCount is by definition never a fraction, so the value of the 32-bit register can be determined by converting $t_{fst}$, which equals 50,849, to binary.

For a pong register with 22-bit fraction width the fraction would be:

frac(22-bit)=(2^22)*(ratio).

Using the ratio of 0.4376 from above, (2^22)*(0.4376)=1835427(ignoring any numbers after the decimal).

Therefore,

FSTCount[31:0]=$t_{fst}$=50849
[00000000000000001100011010100001].

Furthermore,

SFSTCount[31:0]=1835427
[00000000000111000000000110100011].

Note that "d" can be defined as described above (d=r; or d=min{10^(rounddown(log 10($\Sigma s_i$)-1), r}. Another approach for defining "d" can be to make "d" the smallest number it can possibly be such that all the integer portions of $f_i$, =$s_i$/d can fit in the size of the FST table. The value of "d" can be a fractional number (e.g., 0.1), but a goal could be to maximize the use of FST.

The error rates in the above example may be computed as follows for comparison. If using only a single primary FST for the 4 streams with such disparate frame rates, the lowest frame rates $s_1$ and $s_2$ will simply be dropped, and the error will be 2 fps and 34 fps, respectively—an error rate of 100%. For $s_3$=8,383,118 fps and $s_4$=500,111,222 fps, the rates generated will be 8380000 fps and 500110000 fps, respectively, giving errors of 3,118 and 1,222 fps, respectively.

For the two table approach, the sparser streams can now be represented in the SFST and accessed using the ping-pong approach. The output rates and error rates become $s_1$=1.9999995 fps error$_1$=4.69×10$^{-7}$ fps;

$s_2$=33.999992 fps error$_2$=7.97×10$^{-6}$ fps;

$s_3$=8,383,117.999 fps error$_3$=7.14×10$^{-4}$ fps; and $s_4$=500,111,222 fps error$_4$=-7.22×10$^{-4}$ fps.

These are all vastly smaller than the error rates achieved using the single FST approach.

The entries in the FST table can be further reduced by finding their greatest common denominator (GCD). For example, if the FST only has space for 2,000 entries, the sum of the optimized entries cannot be bigger than 2048. Then, if there is an excess fractional part (e.g., fraction[$f_i$] not equal 0), then a second FST table (e.g., the SFST table) may be needed.

In some implementations, "r" cannot be smaller than "d." In this embodiment, a goal can be to make "r" as large as possible, such that when "r" is multiplied by all the fractions (e.g., $n_i$=$f_{fraci}$*r), all the entries still can fit in the size of the SFST, also considering the fact that the SFST can be reduced by GCD. The value of "d" can also be determined using other methods that would be apparent to a person of ordinary skill in the art.

In a simplified version of the technology disclosed, the factions are not included in the SFSTCount. Rather, the technology disclosed uses/accesses the FST "X" times and uses/accesses the SFST "Y" times (e.g., loop through the FST "X" times then loop through the SFST "Y" times. The ratio between X and Y can be the inverse of the "ratio" calculated above.

FIGS. 7-10 illustrate various calculation examples of profiles of a number of streams of data, desired frame rates, numbers of frame entries per stream per FST and SFST, actual frame rates generated, error rates, etc. for several different combinations of stream rates.

In all cases, while some streams may be transmitted at the proper frame rate, others have errors greater than 1 fps, and in some cases hundreds of frames per second. When implementing the dual-FST approach, the average resulting error rate using the dual-FST approach is significantly lower, sometimes by factors of 10, than the single FST approach.

Computer Implementation

Figure 11:
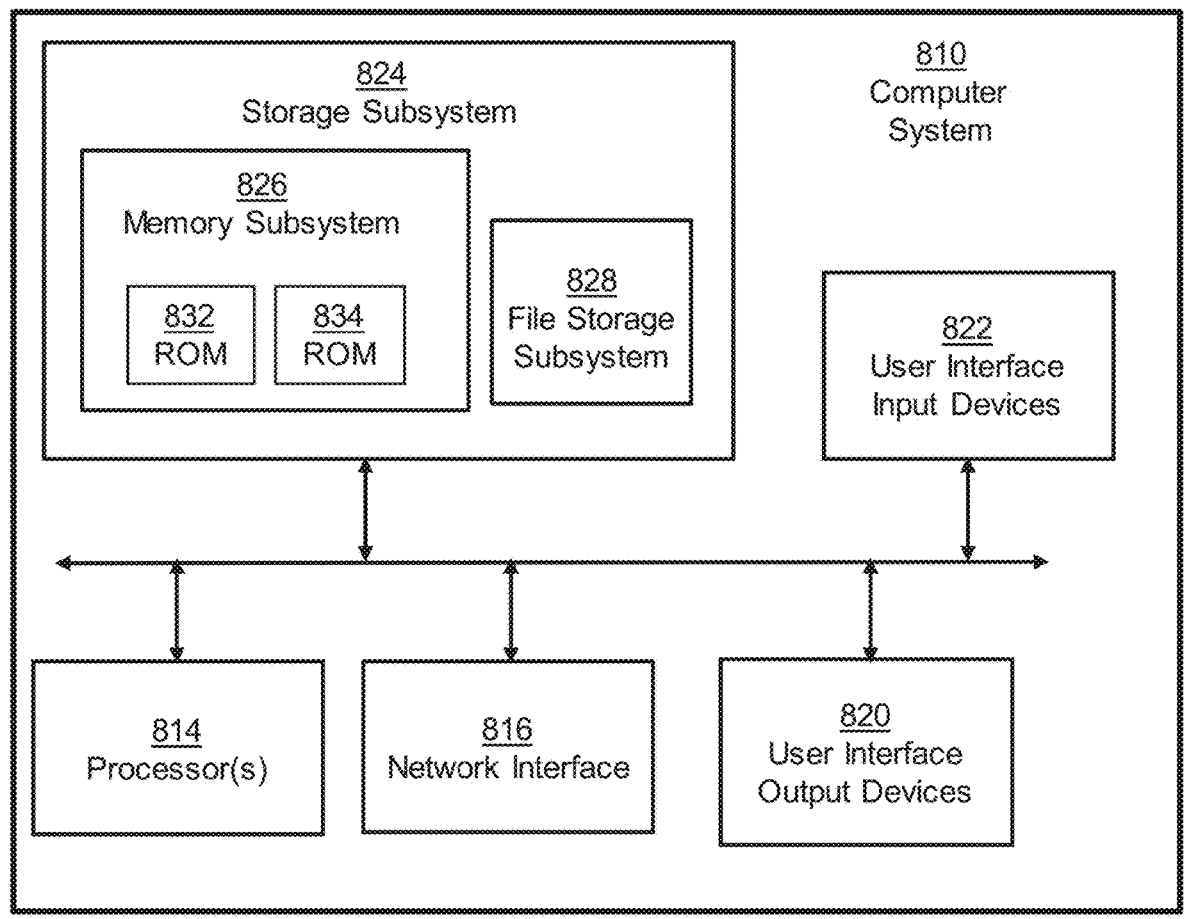
FIG. 11 shows a block diagram of an example computer system, according to one implementation.

FIG. 11 is a block diagram of an example computer system, according to one implementation, which may be used for executing the tests described above. One or more such computer systems can be used to implement some or all of the algorithms and methods for the technology disclosed herein.

Computer system 810 typically includes at least one processor 814 that communicates with a number of peripheral devices via bus subsystem 812. These peripheral devices may include a storage subsystem 824 including, for example, memory devices and a file storage subsystem, user interface input devices 822, user interface output devices 820, and a network interface subsystem 816. The input and output devices allow user interaction with computer system 810. Network interface subsystem 816 provides an interface to outside networks, including an interface to corresponding interface devices in other computer systems.

User interface input devices 822 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 810.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules and methods described herein. These software modules are generally executed by processor 814 alone or in combination with other processors.

Memory 826 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and may include computer readable media such as a hard disk drive, a floppy disk drive along with associated removable media, a CD-ROM drive, an optical drive, or removable media cartridges. The modules implementing the functionality of certain implementations may be stored by file storage subsystem 828 in the storage subsystem 824, or in other machines accessible by the processor.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Figure 10:
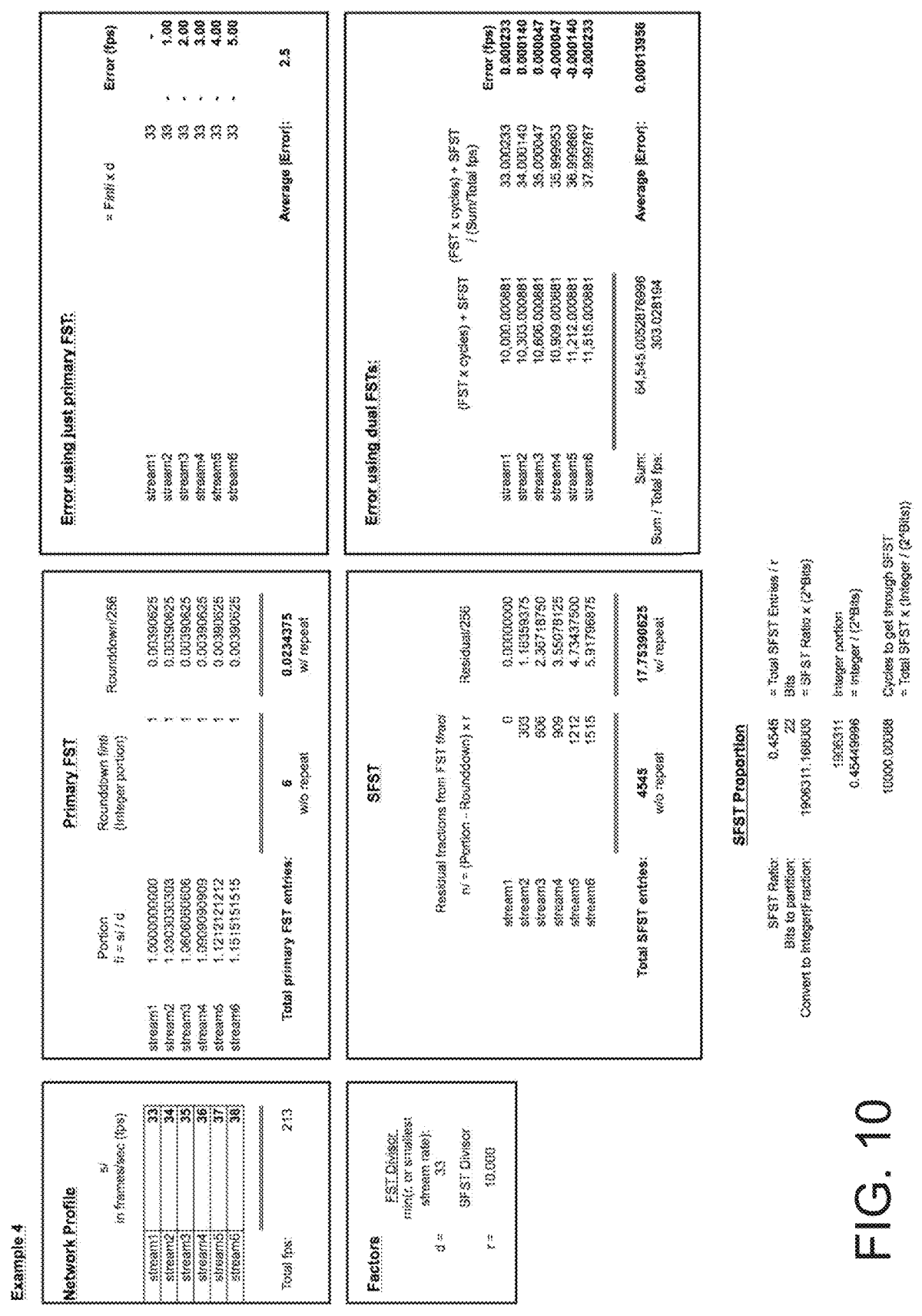

Computer system 810 can be of varying types including a workstation, server, computing cluster, blade server, server farm, or any other data processing system or computing device. Due to the ever-changing nature of computers and networks, the description of computer system 810 depicted in FIG. 10 is intended only as one example. Many other configurations of computer system 810 are possible having more or fewer components than the computer system depicted in FIG. 10.

Other Implementations

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

The use of the term "frame" in this description is likewise intended to encompass its common meaning as describing a digital data transmission unit. Frames commonly have, but are not restricted to have, protocol portions and also data portions, sometimes called payload portions., and may additionally have a specification for an interframe gap. In some implementations, the frames may be packets if a network using packet transmission is used. In some implementations, the frame may be any repeating data structure, such as Ethernet frames, point-to-point protocol frames, fiber channel frames, etc.

Although most of the examples of the technology disclosed herein describe implementations using two FSTs (a primary FST and an additional SFST), implementations with several FSTs are also possible, allowing streams to be parsed among three, four, or even more FSTs. The data streams may be parsed according to bandwidth needed for each, frequency of transmission, or other factors that may make storage using multiple FSTs more efficient. The "ping-pong" state machine would then select which FST is the origin of the data streams using various criteria, and toggle between the multiple sources based on these criteria. Architectures with multiple "ping-pong" state machines may also be utilized in some multi-FST implementations.

While the technology disclosed is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim:

1. A method of providing a data stream emulating network traffic, the method comprising:
  receiving a profile of traffic in a network, wherein the profile comprises information about streams of data comprising frames to be transmitted over the network, the information including data rates in frames per second (fps) for each of the streams of data;
  determining first and second switching criteria based on values for the data rates in the profile;

storing a first portion of the information from the profile in a first frame sequence table (FST), wherein the information stored in the first FST includes frame rates, repeat counts, and frame identifiers;

storing a second portion of the information from the profile in a second frame sequence table (FST), wherein the information stored in the second FST includes frame rates, repeat counts, and frame identifiers;

transmitting data streams comprising frames specified by the first frame sequence table to an output port and comparing information about the transmitted data streams comprising frames specified by the first FST with the first switching criteria; and after the information about the transmitted data streams satisfies the first switching criteria, switching to transmitting data streams comprising frames specified by the second frame sequence table to the output port.

2. The method of claim 1, additionally comprising:

while transmitting data streams comprising frames specified by the second frame sequence table to the output port, comparing information about the transmitted data streams comprising frames specified by the second FST with the second switching criteria; and after the information about the transmitted data streams comprising frames specified by the second FST satisfies the second switching criteria, switching to transmitting data streams comprising frames specified by the first frame sequence table to the output port.

3. The method of claim 2, wherein the output port is connected to a device under test; and additionally comprising:

measuring network metrics for the device under test while the device under test receives data streams transmitted from the output port.

4. The method of claim 1, wherein the streams of data represented in the portion of the information from the profile in the first frame sequence table (FST) have an average value of data rates in fps that is greater than an average value of data rates in fps for the data streams represented in the portion of the information from the profile in the second frame sequence table (FST).

5. The method of claim 1, wherein the first switching criteria are calculated using an accumulator that counts frames transmitted from the first FST, and the first switching criteria are satisfied when a predetermined number of frames from the first FST has been transmitted.

6. The method of claim 2, wherein the second switching criteria are satisfied when a predetermined number of frames from the second FST have been transmitted.

7. The method of claim 1, wherein comparing information about the transmitted data streams comprising frames specified by the first FST with the first switching criteria is carried out within a field programmable gate array (FPGA).

8. The method of claim 2, wherein comparing information about the transmitted data streams comprising frames specified by the second FST with the second switching criteria is carried out within a field programmable gate array (FPGA).

9. The method of claim 1, wherein the first frame sequence table (FST) and the second frame sequence table are stored in block random access memory (block RAM) of a field programmable gate array (FPGA).

10. The method of claim 2, wherein making a determination that the information about the transmitted data streams comprising frames specified by the first FST satisfies the first switching criteria and making a determination that the information about the transmitted data streams comprising frames specified by the second FST satisfies the second switching criteria use a state machine programmed on a field programmable gate array (FPGA).

11. The method of claim 1, wherein storing the portion of the information from the profile in the first frame sequence table (FST) uses repeat counts associated with frame identifiers to store the information.

12. The method of claim 1, wherein the profile of network traffic is provided by a user through a user interface.

13. The method of claim 1, wherein:

determining the first and second switching criteria based on the values for the data rates in the profile involves a calculation of a sum of all data rates in frames per second (fps) for the streams of data in the profile.

14. The method of claim 1, wherein:

the profile comprises information about more than a million streams of data.

15. A system for providing emulated network traffic, comprising:

a user interface to allow a user to input a profile of traffic in a network, the profile comprising information about streams of data comprising frames to be transmitted over the network, the information including data rates in frames per second (fps) for each of the streams of data;

memory circuitry for storing two or more frame sequence tables (FSTs), each FST containing a portion of the information from the profile, including frame rates, repeat counts, and frame identifiers, and each FST configured to specify one or more sequences of frames for the streams of data to be transmitted over the network;

logic circuitry comprising firmware configured to:

(i) determine a first and second switching criteria based on values for data rates in an inputted profile of traffic in a network, (ii) make a comparison of information about transmitted data streams with the first and second switching criteria, and (iii) based on the comparison, select which FST will specify frames to be transmitted through the system; and an output port that provides the frames transmitted through the system to circuitry to be tested.

16. The system of claim 15, wherein the memory circuitry is a portion of block RAM of an FPGA.

17. The system of claim 15, wherein the logic circuitry comprises a state machine.

18. The system of claim 15, wherein the logic circuitry comprises registers that track frames that have been provided by the FSTs to the output port.

19. The system of claim 15, wherein the logic circuitry is programmed in a portion an FPGA.

20. A non-transitory computer-readable recording medium having computer program instructions recorded thereon, the computer program instructions being for utilizing two frame sequence tables for generating network traffic, and the computer program instructions, when executed on one or more processors, cause the one or more processors to perform operations comprising:

receiving a profile of traffic in a network, wherein the profile comprises information about streams of data comprising frames to be transmitted over the network, the information including data rates in frames per second (fps) for each of the streams of data;

determining first and second switching criteria based on values for the data rates in the profile;

storing a first portion of the information from the profile in a first frame sequence table (FST), wherein the information stored in the first FST includes frame rates, repeat counts, and frame identifiers;

storing a second portion of the information from the profile in a second frame sequence table (FST), wherein the information stored in the second FST includes frame rates, repeat counts, and frame identifiers;

transmitting data streams comprising frames specified by the first frame sequence table to an output port and comparing information about the transmitted data streams comprising frames specified by the first FST with the first switching criteria; and after the information about the transmitted data streams satisfies the first switching criteria, switching to transmitting data streams comprising frames specified by the second frame sequence table to the output port.

\* \* \* \* \*